Figure 1:
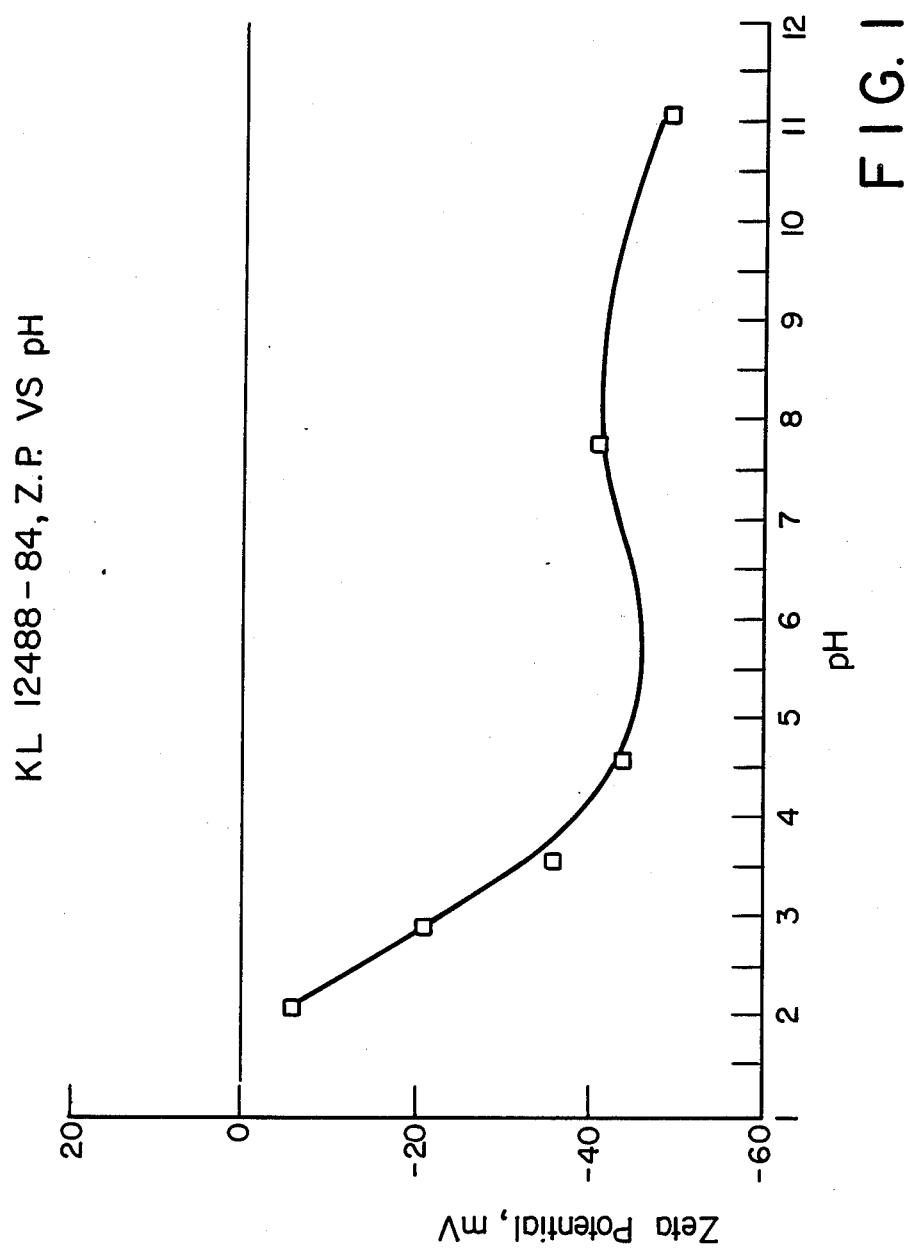

United States Patent [19]

Behan et al.

[11] Patent Number: 4,853,355

[45] Date of Patent: Aug. 1, 1989

[54] SILICA BONDING OF MOLECULAR SIEVES

[75] Inventors: Albert S. Behan, Bronxville, N.Y.; Robert L. Chiang, Oakland, N.J.; Mark T. Staniulis, Peekskill, N.Y.

[73] Assignee: UOP, Des Plains, Ill.

[21] Appl. No.: 141,712

[22] Filed: Jan. 7, 1988

[51] Int. Cl.$^4$ .......................... B01J 29/04; B01J 29/06
[52] U.S. Cl. .......................................... 502/64; 502/65
[58] Field of Search ..................................... 502/64, 65

[56] References Cited

U.S. PATENT DOCUMENTS

| | | | |
|---|---|---|---|
| 3,624,003 | 11/1971 | Conde et al. | 502/64 |
| 3,764,563 | 10/1973 | Minachev et al. | 502/64 |
| 3,867,279 | 2/1975 | Young | 208/114 |
| 4,238,243 | 12/1980 | Tu et al. | 502/64 |
| 4,528,276 | 7/1985 | Cambell et al. | 502/64 |
| 4,582,815 | 4/1986 | Bowes | 502/64 |
| 4,631,267 | 12/1986 | Lachman et al. | 502/64 |
| 4,714,690 | 12/1987 | Strack et al. | 502/64 |

FOREIGN PATENT DOCUMENTS

| | | |
|---|---|---|
| 167324 | 1/1986 | European Pat. Off. . |
| 1944879 | 3/1971 | Fed. Rep. of Germany . |
| 59-203628 | 11/1984 | Japan . |
| 60-168536 | 9/1985 | Japan . |

*Primary Examiner*—Carl F. Dees
*Attorney, Agent, or Firm*—Vincent J. Vasta, Jr.

[57] ABSTRACT

A method for enhancing the binding of certain negatively surface charged molecular sieves to a silica binder is disclosed. As modified, molecular sieves having enhanced binding characteristics are also taught.

11 Claims, 4 Drawing Sheets

SILICA BONDING OF MOLECULAR SIEVES

FIELD OF THE INVENTION

This invention relates to the field of enhancement of silica bonding of molecular sieves. More specifically, this invention concerns the use of a modifying agent to alter the surface charge of certain molecular sieves having a negative surface charge which adversely affects the ability of such molecular sieves to bond with silica.

BACKGROUND OF THE INVENTION

The use of molecular sieves with a variety of binders is well known to the art. With the develoment of new and/or improved applications for molecular sieves requiring the use of various molecular sieves having increasingly higher $SiO_2/Al_2O_3$ ratios and a concurrent desire to bind such sieves with a silica binder, the problem of obtaining a satisfactory bond between the sieve and the silica bonding agent, has received increasing attention.

As the $SiO_2/Al_2O_3$ ratio of a molecular sieve increases the bonding of these materials become more difficult particularly when silica is used as a binder. The increase in negative surface charge is associated with the increase in silica present on the sieve surface which cuses repulsion between the sieve and the binder thus resulting in poor strength. Up to the present time, alkali metal ions have been used a cross-linking agents in the silica bonding of silica rich molecular sieves, however, this route is prohibitive for some catalyst applications, since such agents adversely effect the activity and/or performance of the resultant catalyst.

The following represents an overview of some of the more recent attempts to address the problem, and reflects the current state of the art in this area:

European Application EP-167324-Bowes), filed Jan. 8, 1986, discloses $SiO_2$-rich extrudates which are prepared by mixing a siliceous solid (for example $SiO_2$ and a zeolite) with water and a alkali metal compound to give a mixture with a total solids content of 25-75 wt. % and an alkali metal content of 0.25-10 wt. % calculated on a dry basis.

German Often. De 1944879 (WACKS) Mar. 11, 1971 teaches silica-bonded molecular sieves of unreduced apparent pore diameter which are prepared by mixing zeolites with $(NaPO_3)_3$ and K silicate, drying and removing at $K_2HPO_4$.

U.S. Pat. No. 3,867,279 (Young), which issued Feb. 18, 1975, discloses a catalytic cracking process which employs $SiO_2$ onded silicate particles having improved crush strength which are prepared by mixing reactive $SiO_2$ sols with the siliceous particles in an aqueous medium under conditions of temperature and contact time sufficient to at least partially bond the sol and silicate.

Japanese Pat. No. JP 49/203638 (Asahi Glass Co.), Nov. 17, 1984, teaches a mixture of $SiO_2$ gel and zeolite which is pelletized to form a desiccant for automobile air conditioner refrigerant.

Japanese Pat. No. JP 60/68536 Sept. 2, 1985 teaches granular adsorbents bound by synthetic resin binders having continuous pores. These materials are mixed, press-molded to a degree that the grains are in contact with each other and then dried to yield adsorbent moldings.

None of the aforementioned prior art references disclose the method of the present invention nor the advantages to be achieved by carrying out the steps herein disclosed by the applicants.

SUMMARY OF THE INVENTION

The present invention is directed to a process for enhancing silica binding of molecular sieves having a negatively charged surface by the use of a modifying agent to reverse the charge on the surface of such molecular sieves, and thereby affect the mutual attraction between the sieve and the binder.

Generally, it has been found that molecular sieves with a $SiO_2/Al_2O_3$ ratio of greater than 4.0 have a negatively charged surface in the pH range of 3.0 to 11.0.

DESCRIPTION OF THE INVENTION

It has been found that the silica bonding of negatively surface charged molecular sieves is enhanced by modifying the sieve surface with a cationic species, such as Al, La or Zr, prior to contacting the sieve with the silica binder. Nitrate, chloride and sulfate salts of the indicated cationic species can be effectively used such as for example aluminahydroxynitrate (AHN) and aluminum chlorhydrol (ACH).

The modifying agent may be contacted with the surface of the molecular sieve to be treated using any one of a variety of known procedures, for example, by mullling or by slurrying the molecular sieve with the modifying agent being added, either in batch or by continuous feeding.

Preferentially, in modifying the sieve surface, a solution of the metal salt is added directly to the muller when the molecular sieve is mixing and prior to the addition of the silica binder source, followed by extrusion of the bound product into pellets. Alternatively, aluminum, or other suitable metal, can be contacted with the sieve in a slurry followed by pH adjustment to precipitate different metallic species on the sieve surface depending on the final pH.

The modified sieve is separated from the slurry, contacted with the silica binder, and either spray dried or extruded into product.

Aluminum species will preferentially be employed to modify the moleculr sieves, due to cost considerations. If aluminum imparts an unacceptable excess of acidity to the product, La or Zr species can be used, usually with equal advantage.

It has been determined that it is critical to monitor the surface charge on the molecular sieve while treating it with the surface modifying agent in order to properly determine and control the level of modifying agent to be added to reach the isoelectric point (IEP). Preferentially, the resultant, as modified, molecular sieve will have been treated to have achieved a slightly positive charge on the sieve surface.

The level of addition of the surface modifying agent will vary from molecuar sieve to molecular sieve and will be dependant upon a number of factors including:
(1) the strength of charge in the species present in the modifying agent,
(2) the particle size of the molecular sieve to be modified, and,
(3) the $SiO_2/Al_2O_3$ ratio and pH of the molecular sieve to be modified.

It has been found that an effective way of determining the IEP is to conduct electrophoretic measurements on the sieve which is to be modified. The use of too much cation species in treating a given molecular sieve can be detrimental to both the strength and activity of the resultant silica bond molecular sieve. Thus it is essential to add only enough modifying agent to create a slight positive charge on the sieve surface without introducing too much.

In the case of silica bonding of molecular sieves that are to be used as adsorbents the addition of alkali ions as gelling agents is not detrimental. The forming of these materials into pellets using an auger extruder can be extremely difficult due to changes in rheology during forming. As the silica/alumina ratio of the molecular sieve increases so does the hydrophobicity of the material causing moisture to be expelled during the forming process. The resulting mull batch becomes dilatant making it impossible to form pellets continuously thru the extruder. The addition of a cationic species will bring the surface charge of the molecular sieve to the isoelectric point and prevent dilatant behavior. It is important that the surface charge is monitored because, if an excess of cationic species is added, the sieve surface charge will reverse again leading to dilatant behavior.

EXAMPLES

While the invention has been described above, the details of the present invention will be better understood by recourse to the following examples:

EXAMPLE I

Modification of Molecular Sieve with $Al(NO_3)_3$

Formulation:

| Molecular Sieve (K-L) | 80% |
| --- | --- |
| $Al_2O_3$ [$Al(NO_3)_3$] | 1.3% (sieve basis) |
| $SiO_2$ (Ludox-AS-40) | 20% (sieve basis) |

Procedure:

The molecular sieve is mixed in a muller for 15 minutes, followed by the addition of the $Al(NO_3)_3$, with further mulling for another 15 minutes, followed by the addition of the Ludox-AS-40 silica binder and further mullling for 15 minutes. The resultant mass is extruded into 5/64" pellets and calcined at 500° C.

The dried product pellets were found to have a flat plate crush strength of 8.1 pounds, as compared to a crush strength of less than 3.0 pounds for the unmodified product.

Figure 2:
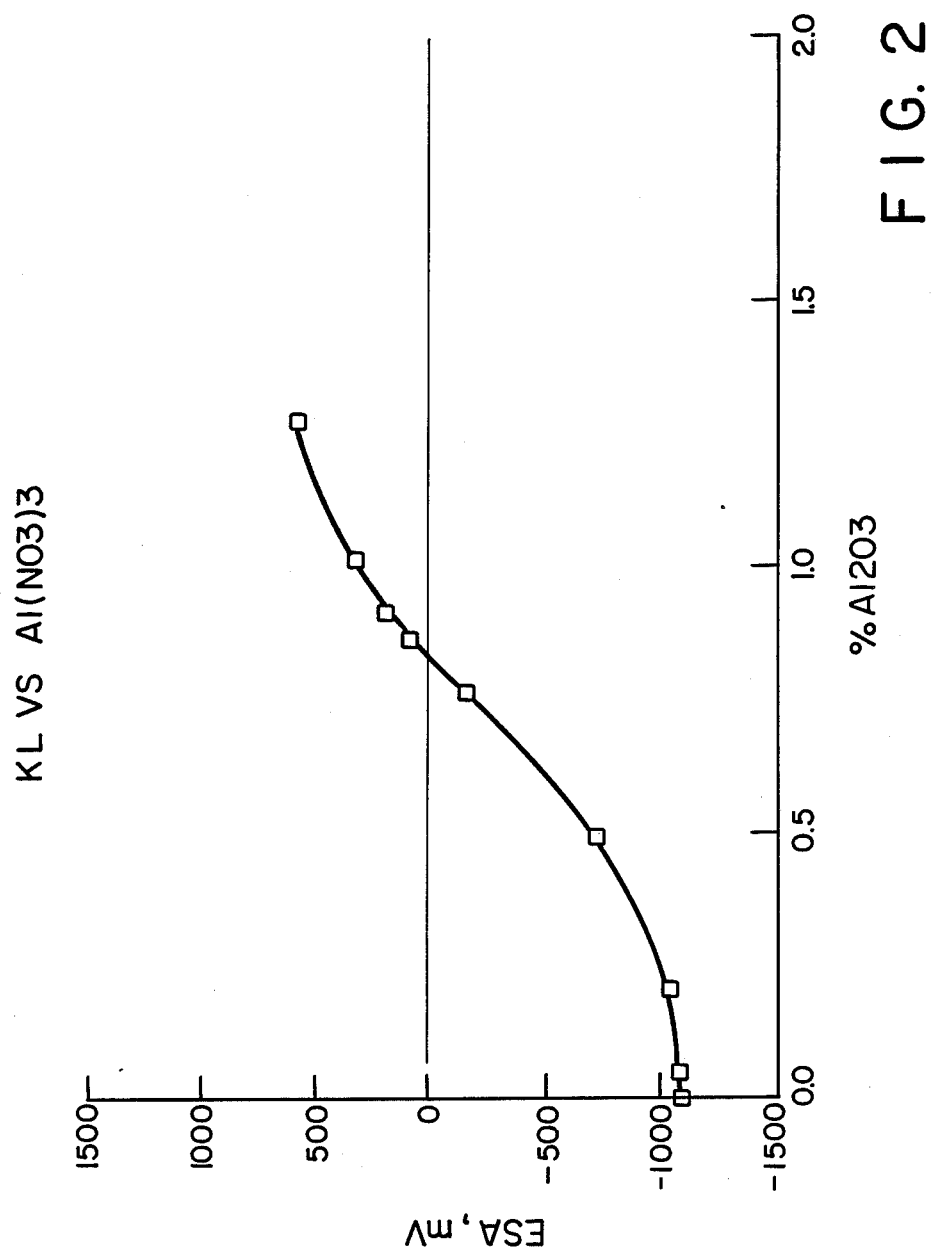
Figure 3:
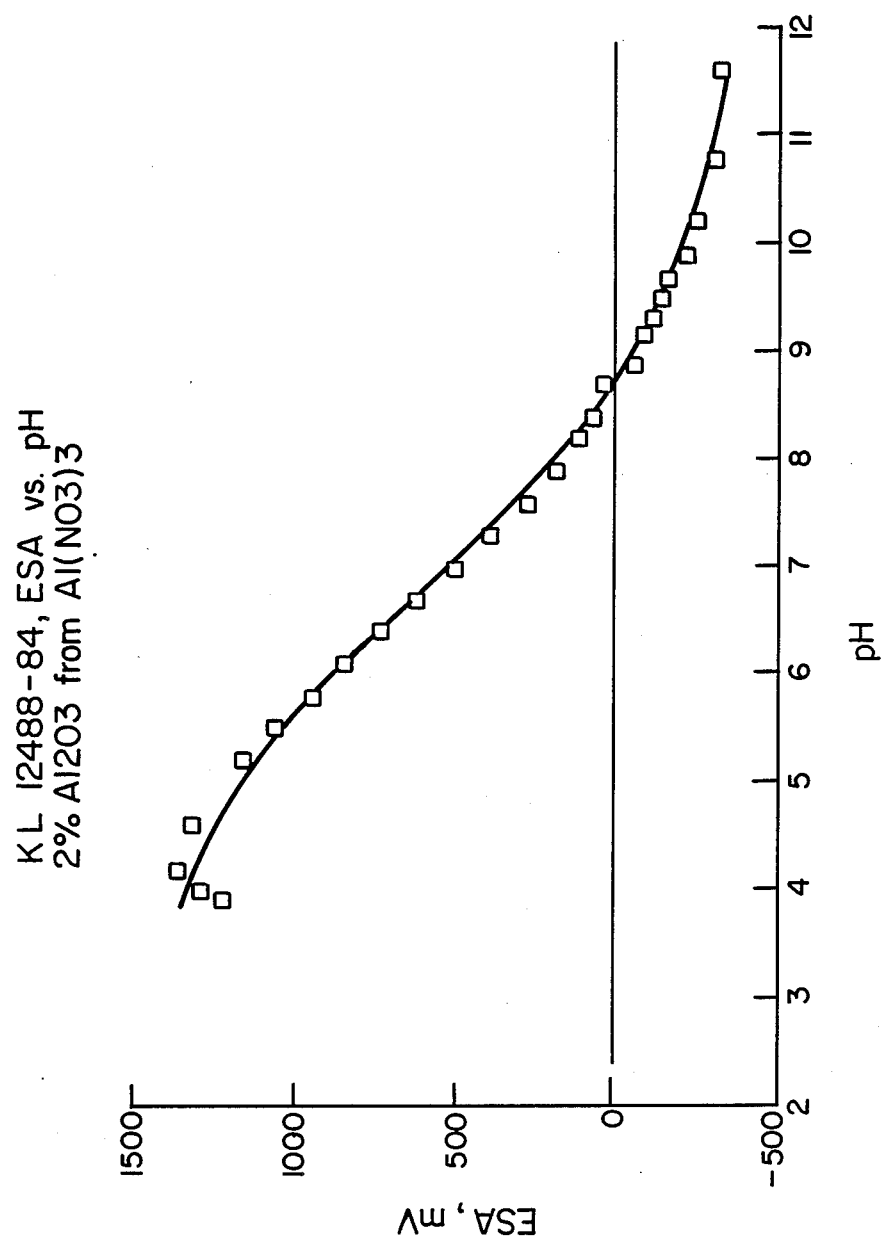

FIG. 1 shows the surface charge (zeta potential by electrophoresis) versus pH for an un-modified K-L zeolite. The sieve has a negative surface charge in the pH range of 2 to 11. FIG. 2 shows a titration curve on a 5% K-L/water slurry monitoring surface charge (acoustophoretic technique) versus $Al_2O_3$ (added as $Al(NO_3)_3$) to determine the level of alumina necessary to reverse the particle surface charge. FIG. 3 shows the surface charge versus pH of the K-L zeolite after modification. The K-L is now positively charged in the pH range <8.5.

EXAMPLE II

Modification of Molecular Sieve With AHN

Formulation:

| Molecular Sieve (K-L) | 80% |
| --- | --- |
| $Al_2O_3$ (AHN) | 10% (sieve basis) |
| $SiO_2$ (Ludox AS-40) | 10% (sieve basis) |

Procedure:

The procedure of Example I was employed substituting the AHN for the $Al(NO_3)_3$.

The resultant dried product pellets were found to have a flat platecrush strength of 17 pounds, as compared with a crush strength of less than 3 pounds for the unmodified product.

EXAMPLE III

Modification of Molecular Sieve With ACH

Formulation:

| Molecular Sieve (K-L) | 80% |
| --- | --- |
| $Al_2O_3$ (ACH) | 2.0% (sieve basis) |
| $SiO_2$ (Ludox AS-40) | 20.0% (sieve basis) |

Procedure:

The procedure of Example I was employed substituting the ACH for the $Al(NO_3)_3$.

The resultant dried product pellets were found to have a flat plate crush strength of 6.0 pounds, as compared with a crush strength of less than 3 pounds for the unmodified product.

EXAMPLE IV

Modification of Molecular Sieve With $La(NO_3)_3$

Formulation:

| Molecular Sieve (K-L) | 80% |
| --- | --- |
| $La_2O_3$ [$La(NO_3)_3$] | 7.5% (sieve basis) |
| $SiO_2$ (Ludox AS-40) | 20% (sieve basis) |

Procedure:

The procedure of Example I was utilized substitution the $La(NO_3)_3$ for the $Al(NO_3)_3$.

The resultant dried product pellets were found to have a flat plate crush strength of 7.0 pounds, as compared with a crush strength of less than 3 pounds for the unmodified product.

EXAMPLE V

Modification of Molecular Sieve by Precipitation of $Al_2O_3$[$Al_2(SO_4)_3$] on Sieve Surface Formulation:

| Molecular Sieve (Silicalite) | 40% |
| --- | --- |
| $Al_2O_3$ [$Al_2(SO_4)_3$] | 2.0% (sieve basis) |
| $SiO_2$ (silica sol) | 20% |
| Kaolin | 40% |

Procedure:

A 20% slurry of molecular sieve was prepared to which is added a solution of $Al_2(SO_4)_3$ with constant mixing. The pH is adjusted to 9.0 with a NaOH and the precipitated sieve filtered and spray dried in the above formulation.

The resultant product was found to have the following attrition characteristics:

Attrition Data—re Example V

| Un-modified - Attrition Total (AT) = 14.5 | |
|---|---|
| Attrition $\frac{slope}{(rate)}$ (AS) = 2.3 | |
| Modified | AT = 9.0 |
| Product | AS = 1.2 |

These data share that the attrition loss rate was cut by approx. 50%, for the as modified product.

Figure 4:
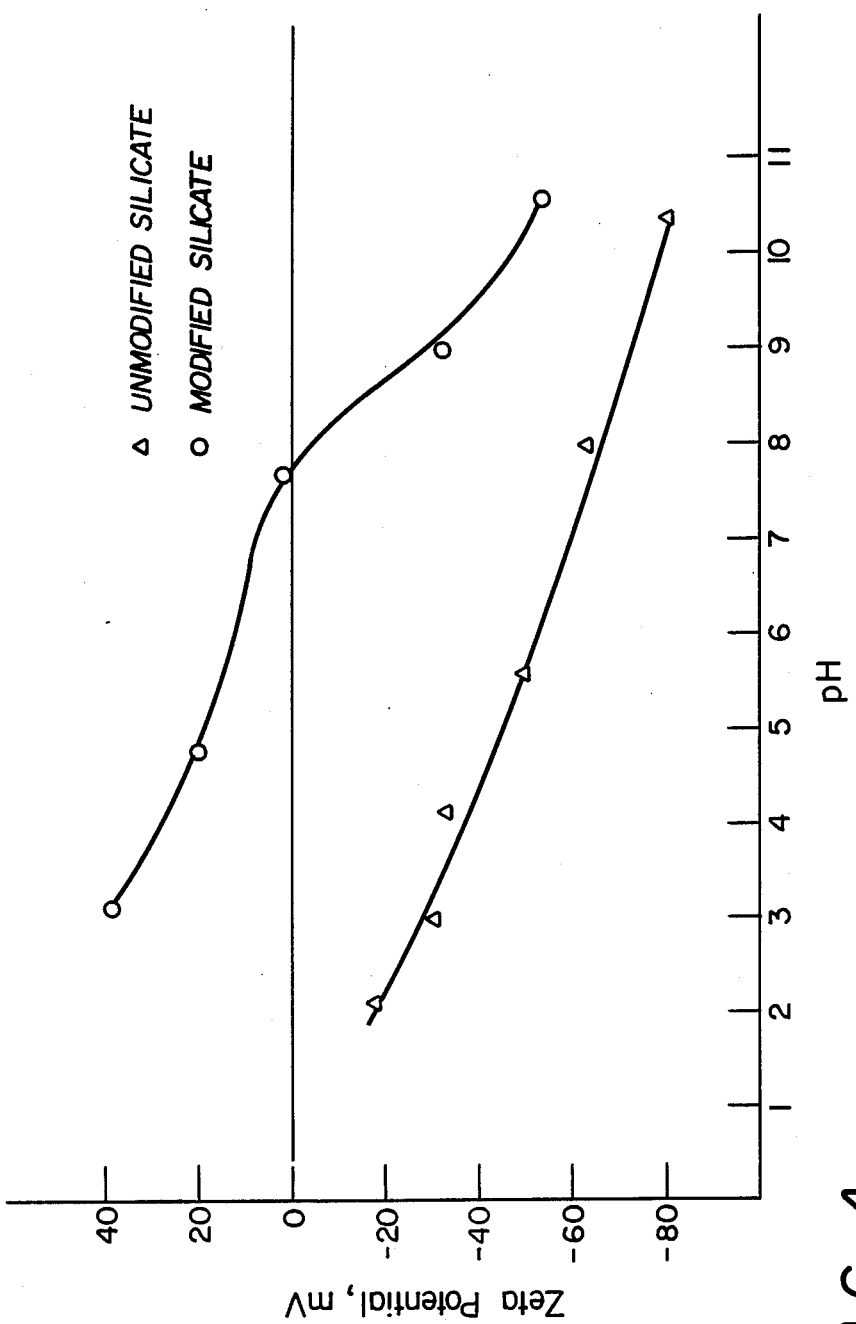

FIG. 4 shows surface charge measurements (zeta potential) versus pH for un-modified and modified Silicalite. The un-modified molecular sieve is negatively charged in the pH range of 2 to 11. After precipitating alumina on the Silicalite surface the material has a positive charge at pH values <7.5.

EXAMPLE VI

Modification of Silicalite Adsorbent with $Al_2O_3$

Formulation:

| Molecular Sieve (Silicalite) | 83.5% |
|---|---|
| $SiO_2$ (Ludox AS-40) | 14.7% |
| K2O (KOH) | 2.4% |
| $Al_2O_3$ (ACH) | 0.13% |

Procedure:

The molecular sieve was prepared in accordance with the procedure of Example I both with and without the addition of $Al_2O_3$. Without the $Al_2O_3$ present the material bound upon in the extruder during the forming step. With the $Al_2O_3$ added the material extruded without difficulty.

It is believed that the enhancement method of the present invention will be applicable to other molecular sieves beside K-L zeolite and silicalite. Specifically, it is anticipated that the enhancement method of the present invention will find equal applicability when utilized in conjunction with ZSM-5, LZ-210, Mordenite, LZ-105 and Zeolite-Y molecular sieves.

While the invention has been described with respect to various specific examples and embodiments, it is to be understood that the invention is not limited thereto and that it can be variously practiced within the scope of the following claims.

We claim:

1. A method of enhancing the binding of negatively surface charged molecular sieves to a silica binder comprising treating the surface of said molecular sieve without substantial impregnation with a cationic species to reverse the charge, on the surface, thereof, prior to contacting said, molecular sieve with the said silica binder.

2. A method according to claim 1 wherein the molecular sieve to be treated is selected from the group comprising K-L zeolite, ZSM-5, LZ-210, Mordenite, LZ-105, Zeolite-Y and silicalite.

3. A method according to claim 2 wherein the cationic species is Al, La or Zr.

4. A method according to claim 1 wherein the molecular sieve to be treated has an $SiO_2/Al_2O_3$ ratio greater than about 4.0, at a pH range of from 3.0 to 11.0.

5. A method according to claim 1 wherein the amount of cationic species to be added is determined by monitoring the surface charge on the molecular sieve to be treated using electrophoretic measurements to determine the level of addition at which the isoelectric point thereof has been reached.

6. A method according to claim 3 wherein the cationic species is derived from a nitrate, chloride or sulfate salt of Al, La or Zr.

7. A method according to claim 3 wherein the cationic species is derived from the group comprising aluminahydroxynitrate (AHH) and aluminum chlorhydrol (ACH).

8. The method of claim 2 wherein the molecular sieve to be treated is a K-L zeolite.

9. The method of claim 2 wherein the molecular sieve is a silicalite.

10. A catalyst comprising a molecular sieve which has been treated according to the method of claim 1.

11. An adsorbent comprising a molecular sieve which has been treated according to the method of claim 1.

* * * * *